US010814979B2

(12) United States Patent
Crowder

(10) Patent No.: US 10,814,979 B2
(45) Date of Patent: Oct. 27, 2020

(54) VERTICAL TAKE-OFF AND LANDING AIRCRAFT WITH VARIABLE IMPELLED AIR VECTORED THRUST APERTURES

(71) Applicant: Taylor Chad Crowder, Dallas, TX (US)

(72) Inventor: Taylor Chad Crowder, Dallas, TX (US)

(*) Notice: Subject to any disclaimer, the term of this patent is extended or adjusted under 35 U.S.C. 154(b) by 464 days.

(21) Appl. No.: 16/027,217

(22) Filed: Jul. 3, 2018

(65) Prior Publication Data

US 2020/0010192 A1 Jan. 9, 2020

(51) Int. Cl.
*B64C 15/14* (2006.01)
*B64C 39/02* (2006.01)
*B64C 27/37* (2006.01)
*B64C 27/10* (2006.01)
*B64C 27/50* (2006.01)

(52) U.S. Cl.
CPC ............ *B64C 39/024* (2013.01); *B64C 27/10* (2013.01); *B64C 27/37* (2013.01); *B64C 27/50* (2013.01); *B64C 2201/102* (2013.01); *B64C 2201/108* (2013.01); *B64C 2201/127* (2013.01); *B64C 2201/18* (2013.01)

(58) Field of Classification Search
CPC ........ B64C 2201/024; B64C 2201/108; B64C 15/14; B64C 15/00
See application file for complete search history.

(56) References Cited

U.S. PATENT DOCUMENTS

| 3,103,327 | A | * | 9/1963 | Parry | B64C 27/20 244/52 |
|---|---|---|---|---|---|
| 3,401,886 | A | | 5/1966 | Osborn | |
| 3,792,827 | A | * | 2/1974 | Girard | B64C 27/026 244/7 A |
| 3,986,686 | A | * | 10/1976 | Girard | B64C 27/24 244/7 A |
| 4,660,785 | A | | 4/1987 | Munski | |
| 5,328,131 | A | * | 7/1994 | Fodera | B64C 27/20 244/12.2 |
| 6,021,976 | A | | 2/2000 | Exter | |
| 6,170,778 | B1 | * | 1/2001 | Cycon | B64C 27/10 244/12.3 |
| 6,450,445 | B1 | | 9/2002 | Moller | |
| 10,107,196 | B2 | * | 10/2018 | Devine | F02C 7/042 |
| 10,486,810 | B2 | * | 11/2019 | Lan | F02K 1/15 |
| 10,625,858 | B2 | * | 4/2020 | Eleryan | B64C 29/00 |
| 2009/0189011 | A1 | | 7/2009 | Bahadir | |
| 2009/0212157 | A1 | | 8/2009 | Arlton | |
| 2016/0040595 | A1 | * | 2/2016 | Devine | F02K 3/077 415/2.1 |
| 2016/0167778 | A1 | | 6/2016 | Meringer | |
| 2020/0172237 | A1 | * | 6/2020 | Fenny | B64C 15/14 |

* cited by examiner

*Primary Examiner* — Brian M O'Hara

(57) ABSTRACT

One embodiment of a vertical take-off and landing aircraft held aloft by way of one or more powered assemblies of wing type elements capable of generating aerodynamic lift by means of rotation. A main body having an integrated means for directing air impelled from an inlet, by way of one or more powered impellers, through a cavity, acting as a duct, to an outlet. At least one movable surface located in sufficient proximity to the outlet to direct expelled air in a vectored manner providing a means of affecting the motion of the aircraft.

10 Claims, 5 Drawing Sheets

VERTICAL TAKE-OFF AND LANDING AIRCRAFT WITH VARIABLE IMPELLED AIR VECTORED THRUST APERTURES

BACKGROUND—PRIOR ART

This application relates to aerodynamically lifted craft, particularly those utilizing thrust vectoring.

Attempting to record visual images remotely, especially of one's self, without the aid of a photographer to hold and steady the camera typically involves the use of a cumbersome tripod or utilization of a fortuitously positioned object as well as a timer or remote to trigger the action.

Although advances in camera technology and the associated supporting equipment, have led to ever shrinking devices, it was not until the recent past that these devices have become small enough for other practical solutions to the previously described situation to be feasible. With the advent of radio controlled rotatory wing craft, cameras could be attached to these non-purpose designed craft and held in a state of semi-static hover with the steady hand of a physical or virtual operator making the necessary adjustments to environmental conditions, such as, changes in air pressure. One flaw in achieving innate steadiness that all of these craft share is that they are not designed with the primary function of remaining in a near static hover. These designs are intended to have the ability to move fair distances with minimal effort in three dimensions and therefore the design of these craft lack inherent and simplistic three dimension stability and require constant and comprehensive adjustment to achieve such relative steadiness. The various methods of achieving three-dimensional stability these craft employ can be placed into two categories. The first and most commonly employed method uses complex mechanisms to manipulate the aerodynamic control surfaces effecting lift characteristics. This method contributes to an increasing complex machine with additional avenues for failure but also engenders further complexity when creating a platform that can be easily stowed for transport in a manner with sufficient convenience such that the average individual can carry the platform on their person commonly. Constant manipulation of aerodynamic control surfaces also generates vibration or tremor, which is detrimental to the quality of a photograph that is being captured from an onboard device. The second method current craft use to achieve three-dimensional stability involves varying the output of the power plant which drives the aerodynamic control surfaces to affect the lift characteristics. This method is afflicted by the same detrimental effects as the method previously discussed such as vibration or tremor generated by constant variation of the power being applied to the rotor or rotors to achieve a level hover. This constant variation of power input can also contribute to higher energy consumption.

SUMMARY

In accordance with one embodiment, a vertical take-off and landing aircraft capable of serving as an aerial electronics platform comprising powered assembly of wing type elements capable of generating aerodynamic lift by means of rotation, an integrated system for impelling air through a main body, and a means of expelling such air from the body in a vectored manner.

Advantages

Accordingly, several advantages of one of more aspects are as follows: To provide an aerial electronics platform capable of holding an electronics payload aloft configured such that it can be made stowable for transport, that incorporates a means for generating air flow for vectored thrust which can be utilized to contribute to a less complex, tremor reducing method of achieving three dimensional stability and means of movement. Other advantages of one or more aspects will be apparent from a consideration of the ensuing drawings and description.

DRAWINGS—FIGURES

In the drawings, closely related figures have the same number but different alphabetic suffices.

DETAILED DESCRIPTIONS—FIGS. 1, 2, 4, 5, 6, 7, 8

Figure 1:
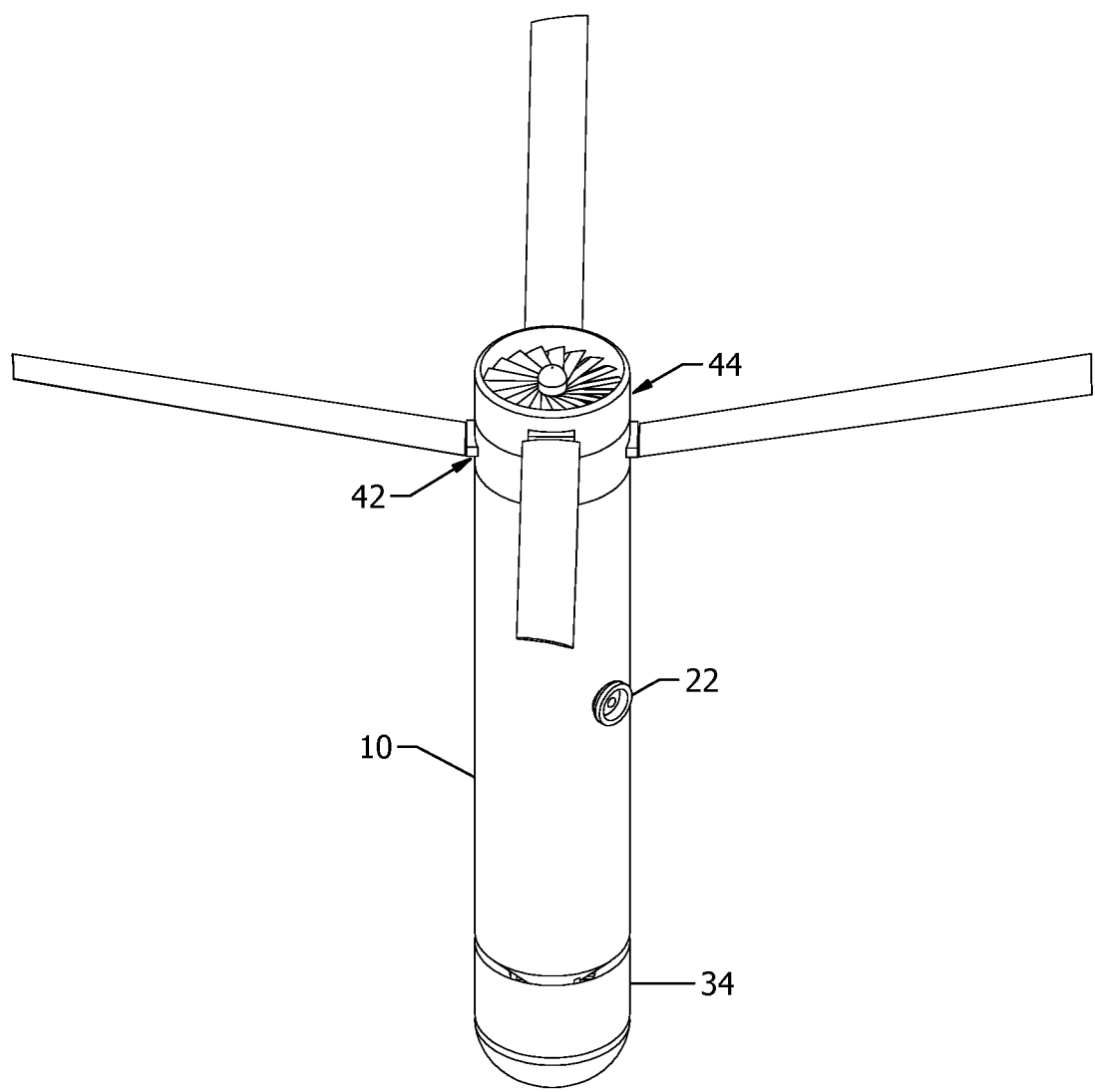
FIG. 1 is a standard isometric view shown in flight configuration.
Figure 2:
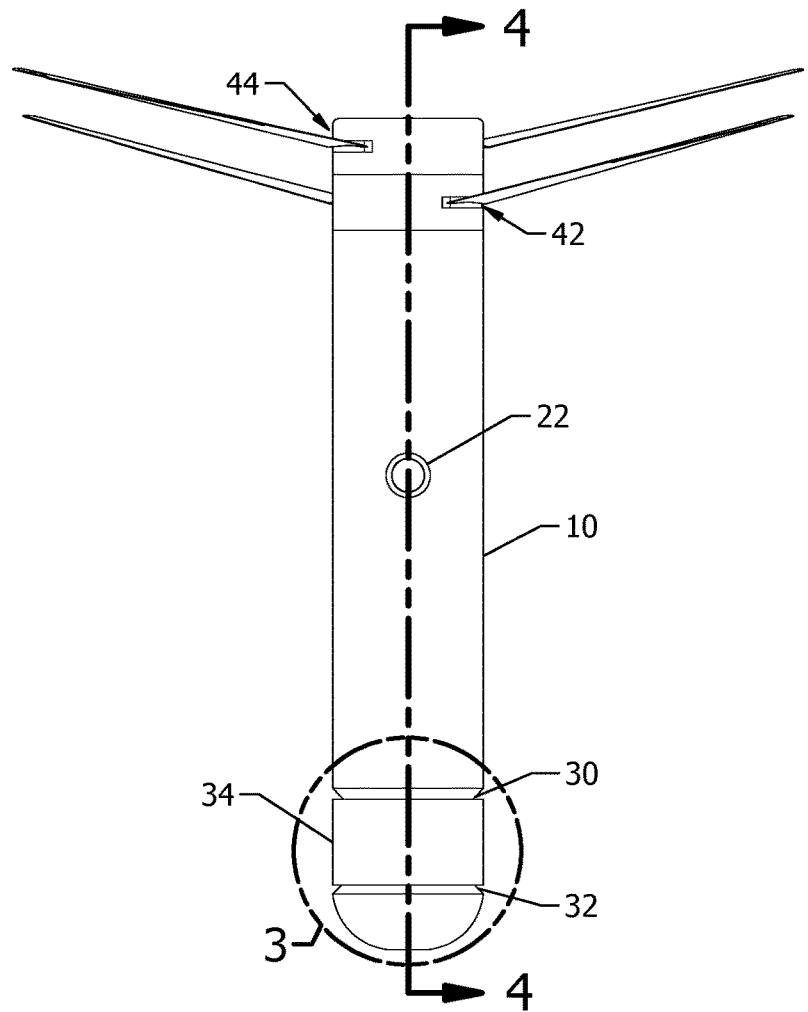
FIG. 2 is a front view.
Figure 4:
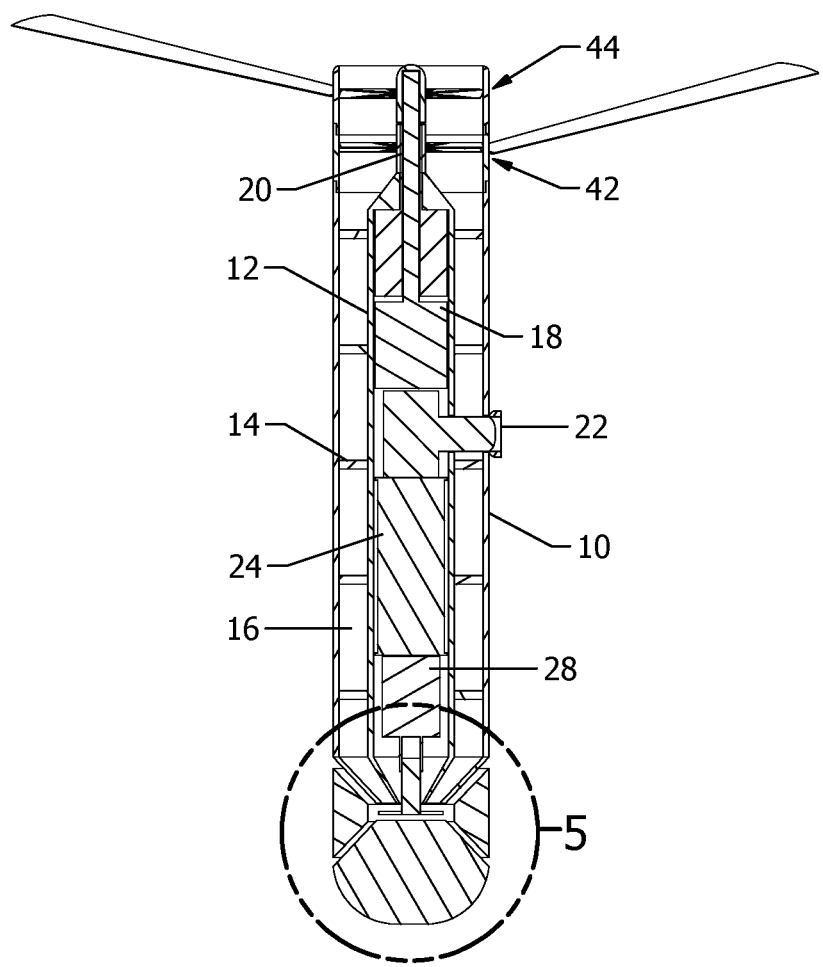
FIG. 4 is a vertical cross sectional view taken through the center of FIG. 2 with the aperture manipulation member shown in neutral position.
Figure 5:
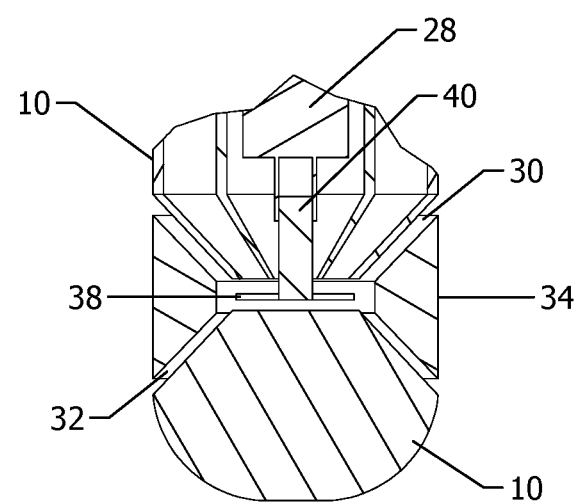
FIG. 5 is a detail view the lower section of the main body taken from FIG. 4 in which the aperture manipulation member is shown in the neutral position.
Figure 7:
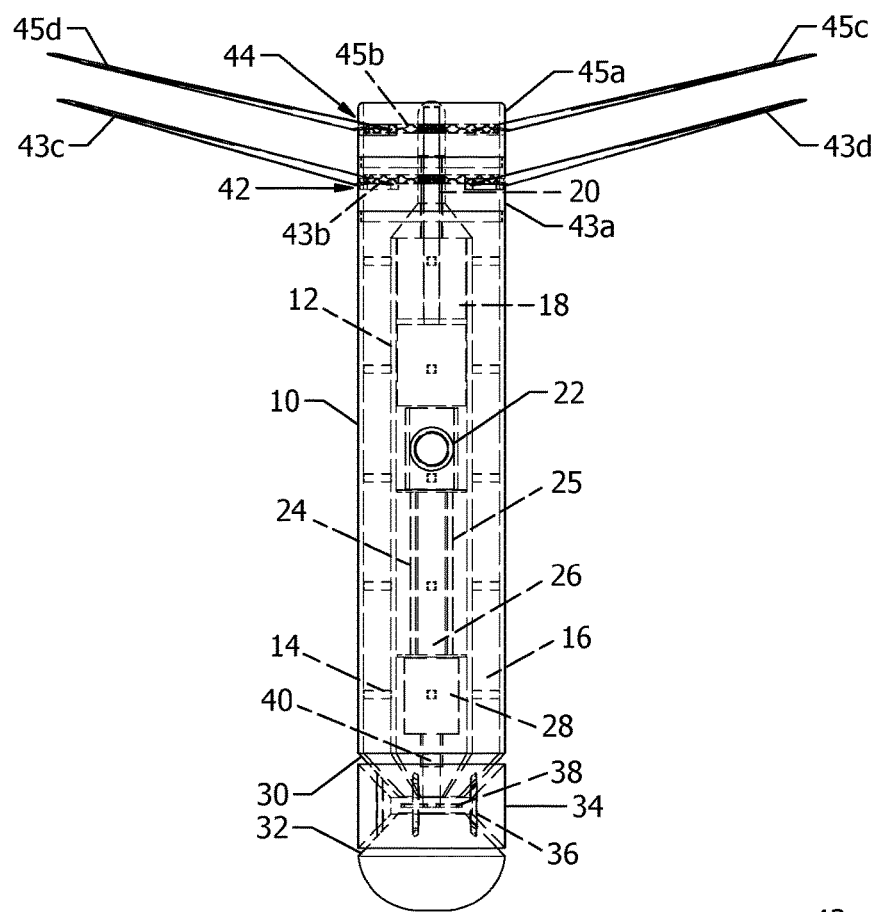
FIG. 7 is a front view with hidden lines visible.
Figure 8:
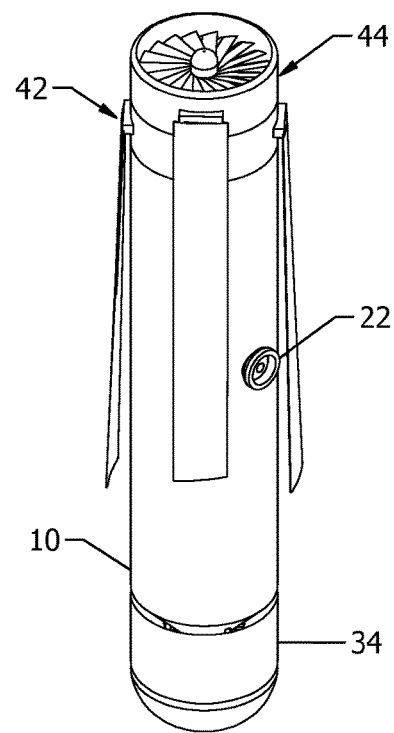
FIG. 8 is an isometric view shown in the stowed configuration.

The embodiments of this invention can be understood by referencing the accompanying drawings. The isometric view of FIG. 1 and front view of FIG. 2 show the main body 10 which houses many of the components of the craft within the internal components compartment 12 (FIG. 4 and FIG. 7). FIG. 4 best illustrates the internal components of the craft with FIG. 7 being useful for further reference. The internal components compartment 12 being rigidly suspended in the center of the main body 10 by a sufficient plurality of ligaments 14. The cavity left between the outside wall of the internal components compartment 12 and the inner wall of the main body 10 servers as the impelled air duct 16. The internal components compartment 12 houses the common electrical equipment necessary to allow a typical craft of this general size to function, such as, a coaxial motor assembly 18 capable of driving an attached contra-rotating coaxial rotor shaft assembly 20, an electronics payload 22 such as a camera, control components 24 and communication components 25 (FIG. 7) which include such components necessary to control the craft and transmit data such as motor controllers, transmitters, receivers, sensors, and the like, a power source 26 (FIG. 7), and an actuation assembly 28 such as a servo. FIG. 5 details the lower end of the main body 10 which is held a part of the rest of the main body 10 by vertical slide supports 36 (FIG. 7), which also act as to support the aperture manipulation member 34. The voids created by the separation of the two sections of the main body 10 and the aperture manipulation member 34 form the upper vectored thrust apertures 30 and lower vectored thrust apertures 32 which are to be of appropriate size to allow the impelled air to escape with sufficient force to affect the motion of the craft when the aperture manipulation member 34 is positioned to allow such action. The aperture manipulation member 34 is further connected to attachment members 38 which are themselves connected to the manipulation shaft 40 being movably attached to the actuation assembly 28.

Figure 6:
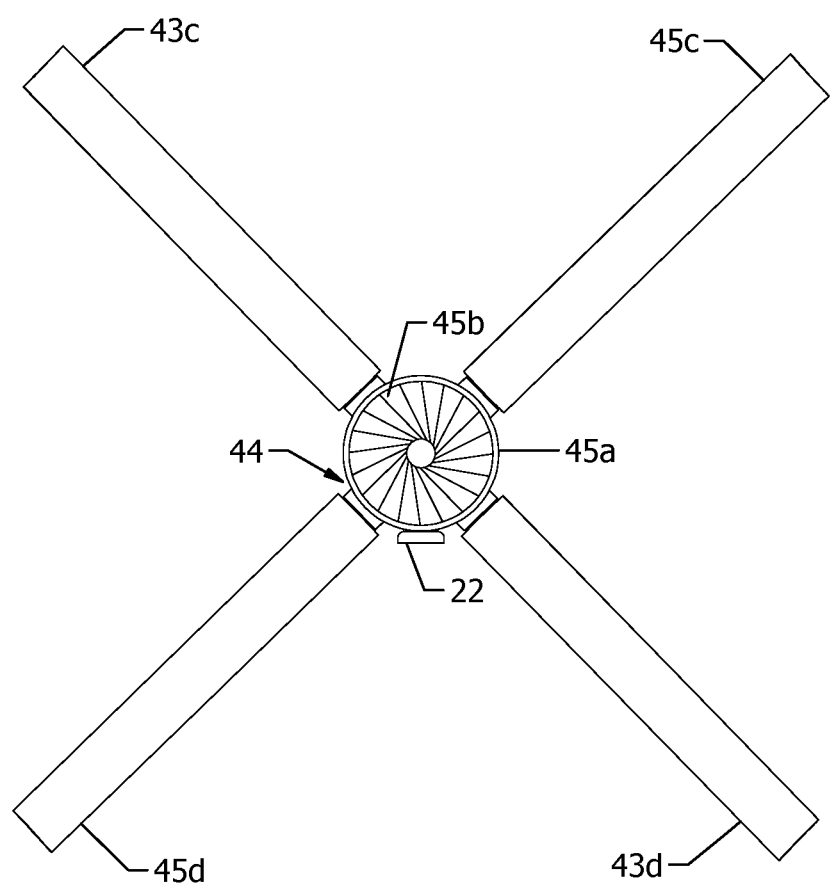
FIG. 6 is a top view showing the upper rotor-impeller assembly.

FIG. 7 further depicts the contra-rotating coaxial rotor shaft assembly 20 which is configured to drive the lower rotor-impeller assembly 42 and the upper rotor-impeller assembly 44. The lower rotor-impeller assembly is made up of lower rotor blade #1 43c and lower rotor blade #2 43d being independently connected by hinged attachments to the lower rotor hub 43a which is further joined to the lower impeller 43b. The upper rotor-impeller assembly 44 is arranged in the same fashion. That is the upper rotor-impeller assembly is made up of upper rotor blade #1 45c and upper rotor blade #2 45d being independently connected by hinged attachments to the upper rotor hub 45a which is further joined to the upper impeller 45b. As shown in FIG. 1 and FIG. 6 the top most portion of the upper rotor-impeller assembly 44 is uncapped and is to act as an air inlet.

Upper rotor blade #1 45c and upper rotor blade #2 45d, as well as, lower rotor blade #1 43c and lower rotor blade #2 43d being hinged at the connection point to the respective upper rotor hub 45a and lower rotor hub 43a allow them to be downwardly and inwardly collapsible toward the main body such that the entire craft is of a size that is able to be stowed on one's person.

Operations—FIGS. 3A, 3b, 4, 7

The manner in which this craft operates leverages action common and necessary to rotary wing craft and utilizes it to provide stability and means for movement. As shown in FIG. 7 the upper rotor-impeller assembly 44 and lower rotor-impeller assembly 42 are rotated by way of the contra-rotating coaxial rotor shaft assembly 20 in a manner such that the upper rotor-impeller assembly 44 and lower rotor-impeller assembly 42 are rotating counter to one another, each in the direction necessary for the assembly to generate lift in the standard manner of a rotary-wing craft. The upper impeller 45b and lower impeller 43b rotate along with their associated rotor-impeller assembly such that air is drawn through the top of the craft acting as an inlet, driven through the upper impeller 45b and further driven through the lower impeller 43b and into impelled air duct 16. This air continues through the impelled air duct 16 until it is expelled through the upper vectored thrust aperture 30 and/or the lower vectored thrust aperture 32 at the lower end of the craft. As the air is being expelled through the apertures it is able to be manipulated by the aperture manipulation member 34, such that the resulting forces imparted on the craft by the airflow can be selectively applied.

The upper rotor-impeller assembly 44 and lower rotor-impeller assembly 42 are driven by the motor assembly 18 at a velocity such that lift generated by the rotors will be sufficient to allow the craft to hover with minimal vertical movement. With this lift being held at a constant value the aperture manipulation member 34 would have the ability to affect the craft in useful ways. The actuation assembly 28 moves the manipulation shaft 40 vertically. This shaft being rigidly attached by way of attachment members 38 connected to the aperture manipulation member 34 which itself is supported by vertical slide supports 36 which connect the upper and lower portions of the main body 10 while allowing the aperture manipulation member 34 to slide vertically in accordance with the motions of the actuation assembly 28.

Figure 3A:
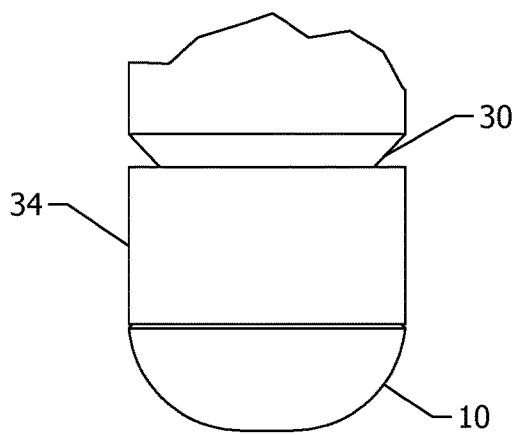
FIG. 3a is a detail view the lower section of the main body taken from FIG. 2 in which the aperture manipulation member is shown in the fully lowered position.
Figure 3B:
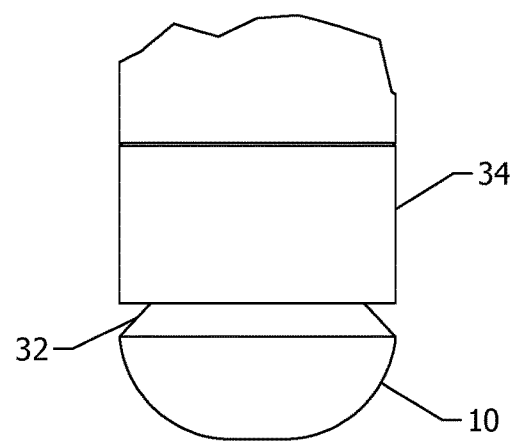
FIG. 3b is a detail view the lower section of the main body taken from FIG. 2 in which the aperture manipulation member is shown in the fully raised position.

When the advantages of the thrust vectoring are not required such as at such point where the craft is able to maintain a constant position without aid the aperture manipulation member 34, the aperture manipulation member 34 can be positioned in a central neutral position as shown in FIG. 4. This will allow the impelled are to be expelled from the upper vectored thrust aperture 30 and lower vectored thrust aperture 32 to be substantially equivalent in air flow, velocity, and direction providing a force of net zero to the craft and therefore not affecting the motion of the craft. However, as is inevitable, air currents and other atmospheric variables will cause the craft to move vertically when such movement is not intended. Should such conditions cause the craft to drift upward, this motion can be arrested by actuating the aperture manipulation member 34 to a position towards the bottom of the craft as shown in FIG. 3a. Such actuation will cause the lower vectored thrust aperture 32 to allow less air to flow while the upper vectored thrust aperture 30 allows more air to flow. As the upper vectored thrust aperture 30 directs airflow in a direction that is generally angled upward in relation to the horizon, this increase in airflow in this direction will impart a downward force on the craft. Once the aperture manipulation member 34 is actuated to a sufficiently downward position, the upward drift will be arrested and static hover can resume. Should the craft drift in the downward position due to the possible environmental conditions previously posed, the aperture manipulation member 34 can be actuated to the upward position causing a reverse effect as shown in FIG. 3b. Sustained thrust from the vectored thrust or more extreme positions of the aperture manipulation member 34 can be utilized to generate motion rather than arrest it should that be desired. Arresting motion in this manner allows the craft to maintain a constant vertical position without the need to vary the output of the motors or adjust the pitch of the rotor blades. This means the craft can minimize the vibration and shutter caused by manipulating the parts of the craft that contribute to the aerodynamic lift generated or torque experience by the craft. Such stability is advantageous to onboard electronics payloads such as a camera in which instability can contribute to poor quality photographs. Actuation of the aperture manipulation member 34 can be controlled by various means such as a remote operator or position detecting sensors or movement detecting sensors such as an accelerometer.

In addition to the considerations of vertical motion, rotational motion or arrestment of such motion can be achieved with the discussed configuration. One method for achieving movement is by inducing slight variation in only one of the motors associated with the coaxial motor assembly 18 (FIG. 4). An increase in the speed of one motor will cause the craft to rotate in one direction. Decreasing the speed of the same motor will cause the craft to rotate in the opposite direction. Such variation in the motor will cause the lifting force generated by the associated rotors to be increased or decreased accordingly, which in-turn will cause the craft move vertically. This vertical movement can then be arrested by varying the aperture manipulation member 34 (FIG. 4) in the manner discussed previously.

It is to be understood that the power source 26, communications components 25 and control components 24 (FIG. 7) are of commonly understood technology used in a craft of this general size and type. All electrical components should be understood to have all commonly understood electrical connections as would be necessary to allow for operation of the craft as described.

CONCLUSION

Accordingly the reader will see that, according to one embodiment of the invention, I have provided a relatively compact aerial electronics platform capable of achieving relative stability and simplistic means of movement with a minimal amount of complexity. While the above disclosure contains many specificities, these should not be construed as limitations on the scope of any embodiment, but as exemplifications of various embodiments thereof. Many other ramifications and variations are possible within the teaching of the various embodiments. Thus the scope should be determined by the appended claims and their legal equivalents, and not by the examples given.

The invention claimed is:

1. A vertical take-off and landing aircraft comprising:
   a. at least one element capable of generating aerodynamic lift by means of rotation,
   b. a means for counteracting the torque produced by said lifting element,
   c. a body configured to allow air to be drawn into an inlet, flow internally to at least 2 outlets, and be expelled from at least one of said outlets in any given instance,
   d. a means for impelling air into said inlet,
   e. a means for directing said impelled air from said outlets in a vectored manner, wherein:
      directions of at least two of said outlets are generally opposing with at least one said outlet oriented generally upward from the horizontal and at least one said outlet oriented generally downward from the horizontal with respect to said body in a reference position of level flight,
      the means for directing said impelled air comprised of at least one movable member capable of directing airflow to and varying the airflow output from said outlets,
      the configuration of said movable member and the movement thereof allows a sum of the cross-sectional area of the outlets to remain constant,
      as said movable member is moved, the cross-sectional area of one or more of said outlets oriented in one direction is decreased while the cross-sectional area of one or more of said outlets oriented in the generally opposing direction is increased by a corresponding amount, whereby a volume of airflow emitted at each of said outlets can be varied while permitting air pressures at said outlets to remain generally constant.

2. The vertical take-off and landing aircraft of claim 1, wherein the element capable of generating aerodynamic lift by means of rotation is a rotary wing type assembly.

3. The vertical take-off and landing aircraft of claim 2, further including an electric motor assembly to drive the rotary wing type assembly.

4. The vertical take-off and landing aircraft of claim 1, wherein the means for counteracting the torque produced by the lifting element is a second rotary wing type assembly coaxially mounted to and rotating counter to a first rotary wing type assembly.

5. The vertical take-off and landing aircraft of claim 4, further including an electric motor assembly to drive said second rotary wing type assembly.

6. The vertical take-off and landing aircraft of claim 1, wherein the said body is configured in a generally cylindrical shape and vertical in orientation with said inlet located generally at upper portion of said body and the outlet being located generally at the lower portion of said body.

7. The vertical take-off and landing aircraft of claim 1, wherein said body further includes and outer wall and an inner wall, the space between the outer wall an inner wall being utilized to allow air to flow from the inlet to the outlet.

8. The vertical take-off and landing aircraft of claim 7, further including a cavity within the inner wall to be utilized to house necessary components, such as, drive, power, transmission, control, and sensor payloads.

9. The vertical take-off and landing aircraft of claim 1, wherein the means for impelling air into said inlet is at least one axial fan integrally attached to an associated rotary wing type assembly by way of a hub.

10. The vertical take-off and landing aircraft of claim 1, further including a servo like device acting as a means of actuating said movable member.

\* \* \* \* \*